(12) United States Patent
Redmond

(10) Patent No.: US 6,538,828 B1
(45) Date of Patent: Mar. 25, 2003

(54) MAGNIFYING PAGE ILLUMINATOR

(76) Inventor: Seamus Redmond, 5634 Lagoon Dr., Fort Lauderdale, FL (US) 33312

( * ) Notice: Subject to any disclaimer, the term of this patent is extended or adjusted under 35 U.S.C. 154(b) by 0 days.

(21) Appl. No.: 10/003,544

(22) Filed: Oct. 24, 2001

(51) Int. Cl.[7] ............................................... G02B 27/02
(52) U.S. Cl. ...................................... 359/800; 359/803
(58) Field of Search ............................... 359/799, 800, 359/801, 802, 803, 804, 805, 806, 807, 808, 809, 708, 711, 712, 718, 896, 798; 362/97, 98

(56) References Cited

U.S. PATENT DOCUMENTS

| | | | |
|---|---|---|---|
| 4,859,032 A | * | 8/1989 | Feinbloom .................. 359/802 |
| 5,021,933 A | * | 6/1991 | Cordes ........................ 362/109 |
| 5,132,849 A | | 7/1992 | Cordes |
| 5,168,405 A | | 12/1992 | Feinbloom |
| 5,429,120 A | | 7/1995 | Lewitus |
| 5,485,317 A | * | 1/1996 | Perissinotto et al. ......... 359/712 |
| 5,757,557 A | * | 5/1998 | Medvedev et al. .......... 359/708 |
| 5,969,884 A | * | 10/1999 | Russell ....................... 359/802 |
| 6,384,988 B1 | * | 5/2002 | Muller et al. ............... 359/798 |

* cited by examiner

*Primary Examiner*—Georgia Epps
*Assistant Examiner*—Saeed Seyrafi
(74) *Attorney, Agent, or Firm*—Alvin S. Blum

(57) ABSTRACT

A hand held device extends across a line of text on a page to enlarge the image and illuminate it as well. The device includes an elongate cylindrical lens that extends across the page. Elongate supports straddle the line and support the lens at a fixed distance above the line to bring the line into focus for the reader. At least one of the supports has a light source at one end that emits light into the transparent support that acts as a light pipe. A roughened surface on the support causes the light to be distributed and emitted onto the line being read. By directing the light only onto the line, less extraneous light reaches the eye for enhanced viewing by a person with cataracts.

10 Claims, 1 Drawing Sheet

MAGNIFYING PAGE ILLUMINATOR

This invention relates to apparatus for facilitating reading, and more particularly to apparatus for both illuminating and magnifying written material.

BACKGROUND OF THE INVENTION

People with impaired eyesight may have difficulty in reading the text of many printed pages. When readers develop cataracts, the room lighting needed to illuminate the page may direct enough scattered light to the eye to obscure the page image. Magnifying lenses that incorporate a light source are well known in the art, as exemplified by U.S. Pat. Nos. 4,859,032 and 5,168,405 issued to Feinbloom; and U.S. Pat. Nos. 5,132,849 and 5,021,933 issued to Cordes. They employ lenses with magnifying elements that are sections of a sphere. Such lenses magnify a circular area beneath the lens. When reading a page of text, the lens will only illuminate and magnify a small portion of the line being read. The user must continuously move the lens from left to right to read the entire line. This is a slow and awkward process. That may account for the poor reception of such devices by the public.

It would be useful to have a hand held device that would illuminate the page without throwing extraneous light to the readers eyes and that would magnify an entire line of type at one time. It would be convenient to have a device that illuminates and magnifies only a limited area for reading so as to not disturb a partner while reading in bed.

SUMMARY OF THE INVENTION

It is accordingly an object of the invention to provide a hand held device that will illuminate and magnify an entire line of type on a page at one time without directing extraneous light to the eyes of the user or to others, or illuminating areas needlessly. It is another object to provide the convenience of an illumination source that conserves power by lighting only the material being viewed. The device of the invention comprises an elongate cylindrical or half-cylindrical lens that is long enough to extend across a printed page to magnify at least one line of type together with a source of illumination that directs light upon the magnified area. Although the magnification is not uniform, being in only one dimension, the enlargement does enhance readability.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
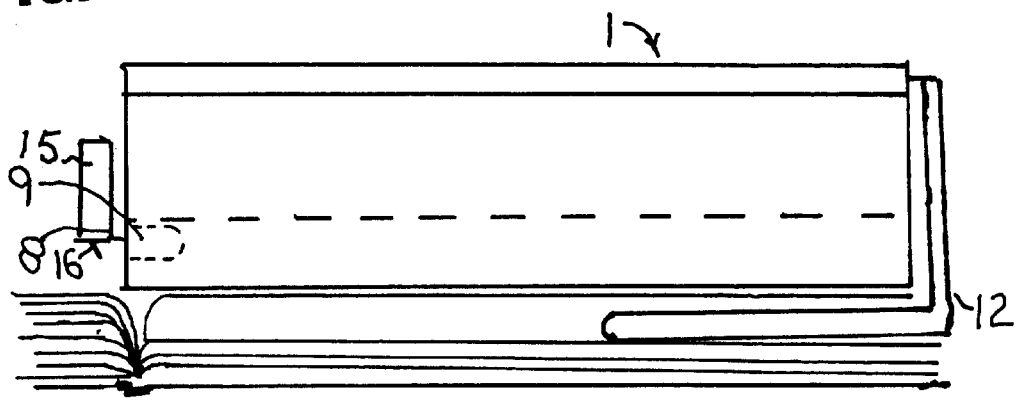
FIG. 1 is a side view of the invention.
Figure 2:
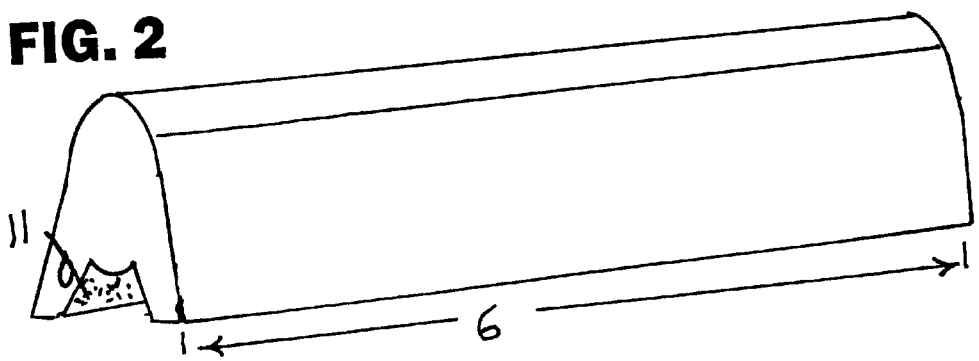
FIG. 2 is a perspective view of the invention without the light source.
Figure 3:
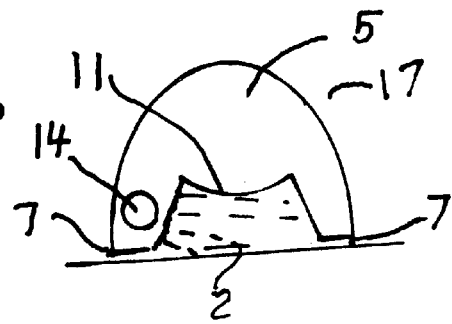
FIG. 3 is an end view of the invention without the light source.

Referring now first to the drawing FIGS. 1–3, the invention comprises a hand held device 1 that includes an elongate biconvex cylindrical lens 5 supported along its length 6 by support means 7 to rest upon a page 4, straddling a line of text 2. The lens is supported up above the page 4 at a distance that will bring the line of text 2 into focus for the reader. An illumination means 8 for illuminating the line of text includes a light source 9 mounted in recess 14 in the support 7. A battery 15 powers the light source through switch 16. The light source may be an LED or incandescent bulb. Alternatively, the source may be powered by line current (not shown). The clear transparent support and lens may be molded in one piece by injection molding or extrusion, for example. The support acts as a light pipe with smooth walls except for the roughened surface 11, which causes diffused light to be emitted therefrom. This directs the light to the line of text on the page, and prevents most of the light from escaping at other surfaces. Because the light is directed only to the line being read, the magnified image is easier for people with cataracts to read. As shown in FIG. 1, the device may optionally be provided with a clip 12 attached to one end of the device for engaging the underside of the page being read. The surfaces not being used for illuminating and viewing may optionally be coated with an opaque and/or reflective coating 17.

Figure 4:
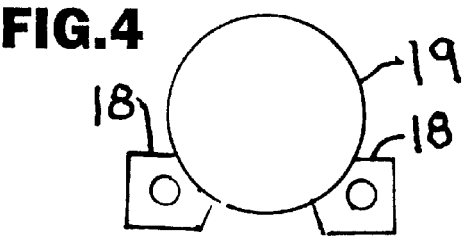
FIG. 4 is an end view of another embodiment of the invention.

Referring now to FIG. 4, another embodiment of the device is shown that may be formed by cementing the elongate legs 18 to an elongate cylindrical rod 19.

Figure 5:
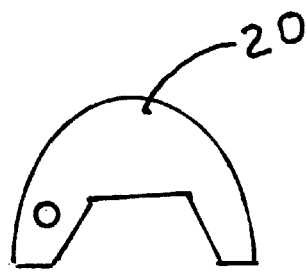
FIG. 5 is an end view of another embodiment of the invention.

Referring now to FIG. 5, another embodiment of the invention is shown in which the lens 20 is plano-convex, that is, one surface is planar, and the other surface is a section of a cylinder with a long axis extending along the width of a page to be read.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A hand held device for illuminating and magnifying at least one entire line of text on a page having a certain width, the device comprising:
   a) a cylindrical lens having a first length at least equal to said certain width;
   b) support means connected to said lens for supporting said lens along said first length above the page at a distance that brings said line into focus; and
   c) illumination means connected to said lens for illuminating said line along said first length, said illumination means directing light to the page and not toward a user.

2. The device according to claim 1 in which said lens is biconvex.

3. The device according to claim 1 in which said lens is piano-convex.

4. The device according to claim 1 in which the illumination means includes a light source at one end of the device and a light pipe for distributing the light from the light source along said first length.

5. The device according to claim 4 in which said light pipe also functions as at least a portion of said support means.

6. The invention according to claim 1 further comprising a clip affixed to the device at one end thereof that can engage the underside of the page.

7. The invention according to claim 1 in which the lens and support means has been molded in one piece.

8. The invention according to claim 1 in which the lens and support means has been formed by a single extrusion.

9. A hand held device for illuminating and magnifying at least one entire line of text on a page having a certain width, the device comprising:
   a) an elongate magnifying lens having at least one surface that is a section of cylinder and having a first length at least equal to said certain width;
   b) support means connected to said lens for supporting said lens along said first length above the page at a distance that brings said line into focus; and
   c) illumination means connected to said lens for illuminating said line along said first length, said illumination means directing light to the page and not toward a user.

10. A hand held device for illuminating and magnifying at least one entire line of text on a page having a certain width, the device comprising:
   a) an elongate magnifying lens having a first length at least equal to said certain width and constructed for magnifying only in a dimension transverse to the first length;
   b) support means connected to said lens for supporting said lens along said first length above the page at a distance that brings said line into focus; and
   c) illumination means connected to said lens for illuminating said line along said first length, said illumination means directing light to the page and not toward a user.

\* \* \* \* \*